United States Patent
Serlet et al.

(10) Patent No.: US 9,075,834 B2
(45) Date of Patent: Jul. 7, 2015

(54) DETECTING DEVIATION BETWEEN REPLICAS USING BLOOM FILTERS

(71) Applicant: upthere, inc., Palo Alto, CA (US)

(72) Inventors: Bertrand Serlet, Palo Alto, CA (US); Louis Monier, Palo Alto, CA (US)

(73) Assignee: UPTHERE, INC., Palo Alto, CA (US)

( * ) Notice: Subject to any disclaimer, the term of this patent is extended or adjusted under 35 U.S.C. 154(b) by 378 days.

(21) Appl. No.: 13/728,133

(22) Filed: Dec. 27, 2012

(65) Prior Publication Data

US 2014/0188816 A1 Jul. 3, 2014

(51) Int. Cl.
*G06F 7/00* (2006.01)
*G06F 17/30* (2006.01)
*G06F 17/15* (2006.01)

(52) U.S. Cl.
CPC .......... *G06F 17/30303* (2013.01); *G06F 17/15* (2013.01)

(58) Field of Classification Search
CPC ....................................................... G06F 17/15
See application file for complete search history.

(56) References Cited

U.S. PATENT DOCUMENTS

| | | | |
|---|---|---|---|
| 7,535,485 | B2 | 5/2009 | Elbaz et al. |
| 8,156,429 | B2 | 4/2012 | Lotenberg |
| 8,223,191 | B2 | 7/2012 | Elbaz et al. |
| 2008/0229103 | A1* | 9/2008 | Mutka et al. ................. 713/168 |
| 2010/0058054 | A1 | 3/2010 | Irvine |
| 2010/0064354 | A1 | 3/2010 | Irvine |
| 2010/0070698 | A1 | 3/2010 | Ungureanu et al. |
| 2011/0010578 | A1 | 1/2011 | Dominguez et al. |
| 2011/0264871 | A1 | 10/2011 | Koifman et al. |
| 2011/0307447 | A1 | 12/2011 | Sabaa et al. |
| 2012/0210120 | A1 | 8/2012 | Irvine |
| 2012/0215980 | A1 | 8/2012 | Irvine |
| 2012/0221524 | A1 | 8/2012 | Auchmoody et al. |
| 2012/0300676 | A1 | 11/2012 | Welin et al. |
| 2012/0311339 | A1 | 12/2012 | Irvine |

(Continued)

FOREIGN PATENT DOCUMENTS

CN 103294610 A 9/2013

OTHER PUBLICATIONS

"Designing Rhino DHT—A fault tolerant, dynamically distributed, hash table—Ayende@ . . . " http:/web.archive.org/web// 20120122041007/ http:/ayende.com/blog/3934/designing-rhino-. . . 2009 (9 pages).

(Continued)

*Primary Examiner* — Ajith Jacob
(74) *Attorney, Agent, or Firm* — Hickman Palermo Becker Bingham LLP; Ellen Y. Wei

(57) ABSTRACT

Techniques are provided for using near-full bloom filters for efficiently identifying hash slices in which the deviation between replicas is sufficient to justify remedial measures. Techniques are also described for adjusting the size of slices and the size of the bloom filters, so that the bloom-filter-to-bloom-filter comparison serves as an accurate indicator of the degree to which the contents of the slices of a slice pair have deviated. Slice size may vary from slice pair to slice pair, so that relatively sparsely populated portions of the ring (access key ranges into which fewer chunks fall) are represented by relatively larger slices, while relatively densely populated portions of the ring (access key ranges into which more chunks fall) are represented by relatively smaller slices.

23 Claims, 11 Drawing Sheets

(56) References Cited

U.S. PATENT DOCUMENTS

2013/0061049 A1  3/2013  Irvine
2013/0198462 A1  8/2013  Serlet et al.
2013/0198475 A1  8/2013  Serlet et al.

OTHER PUBLICATIONS

Zhao, J. et al., "Achieving Reliability Through Reputation in a Wide-Area Network PHT Storage System" 2007 (8 pages).

"Distributed Hash Table—Wikipedia, the free encyclopedia" downloaded from the Internet: http ://web.archive.org/web/20120103125147/ http:/en.wikipedia.org/wiki/Distributed hash . . . Dec. 2011 (5 pages).

U.S. Appl. No. 13/358,742, filed Jan. 26, 2012, Notice of Allowance, Sep. 13, 2013.

Ghemawat, Sanjay, "The Google File System", dated Oct. 2003, ACM, 15 pages.

U.S. Appl. No. 13/622,026, filed Sep. 18, 2012, Office Action, Sep. 29, 2014.

* cited by examiner

300
RING OF HASHES OF CHUNKS IN REPLICA A

302
RING OF HASHES OF CHUNKS IN REPLICA B

DETECTING DEVIATION BETWEEN REPLICAS USING BLOOM FILTERS

CROSS-REFERENCE TO RELATED APPLICATIONS

This application is related to U.S. patent application Ser. No. 13/358,742, filed Jan. 26, 2012, and to U.S. patent application Ser. No. 13/622,026, filed Sep. 18, 2012. The entire contents of both of which are hereby incorporated by reference as if fully set forth herein.

FIELD OF THE INVENTION

The present invention relates to replication and, more specifically, to techniques for efficiently detecting and locating differences between replicated objects.

BACKGROUND

Information that is used to access a stored digital item is referred to herein as the "access key" of the stored item. In typical file systems, stored items are retrieved based on (a) the location at which the items are stored, and (b) a name or identifier of the items. For example, if a file named "foo.txt" is located in a directory named "c:\myfiles\text", then applications may use the pathname "c:\myfiles\text\foo.txt" as the access key to retrieve the file from the file system. Because conventional access keys are based on the location of the items being retrieved, the access keys change when the items are moved. In addition, each copy of an item has a different access key, because each copy is stored at a different location.

In contrast to conventional file systems, Content Addressable Storage (CAS) systems allow applications to retrieve items from storage based on a hash value that is generated from the content of the items. Because CAS systems perform storage-related operations on items based on the hash values generated for the items, and the hash values are based on the content of the items rather than where the items are stored, the applications that request the operations may do so without knowing the number or location of the stored copies of the items. For example, a CAS system may store multiple copies of an item X at locations A, B and C. An application that desires to retrieve item X would do so by sending to the CAS system a hash value that is based on the contents of item X. Based on that hash value, the CAS system would provide to the application a copy of item X retrieved from one of the locations A, B, and C. Thus, the application would obtain item X without knowing where item X was actually stored, how many copies of item X existed, or the specific location from which the retrieved copy was actually obtained.8

Data stored using CAS is often replicated across two or more data centers. When a set of chunks is replicated across multiple data centers, the many replicas of the chunk set are supposed to remain identical. However, in practice, chunk set replicas have small differences. These differences may result from a variety of causes, including data corruption and replication latency.

FIG. 1 is a block diagram that illustrates a scenario in which replicas of the same chunk set are contained in two chunk stores 100 and 102, which may be maintained by two data centers. The replica that is stored in chunk store 100 is shown as replica A, while the replica that is stored in chunk store 102 is shown as replica B. In both chunk stores 100 and 102, the replicas are partitioned across two storage devices. Specifically, replica A is partitioned across storage devices 110 and 120 using horizontal partitioning, while replica B is partitioned across storage devices 112 and 122 using vertical partitioning.

Horizontal partitioning involves selecting where to store chunks based on the range into which their access keys fall. Thus, in chunk store 100, chunks with the access keys in the range MIN to N are stored on storage device 110, while chunks with access keys in the range N+1 to MAX are stored on storage device 120.

In contrast, vertical partitioning involves storing all chunks on a particular device up to a particular point in time (e.g. when the disk becomes full), and then after that point in time storing all new chunks on a different device. Thus, in chunk store 102, chunks for the entire access key range MIN to MAX are stored on storage device 112 until time T1, and after time T1 chunks for the entire access key range MIN to MAX are stored on storage device 122.

Chunk stores 100 and 102 are merely simple examples of how data centers may internally organize the chunks that belong to the replicas they maintain. The organization of the chunk data may become arbitrarily complex, involving a combination of horizontal and vertical partitioning, as well as within-system replication and caching. The techniques described herein are not limited to any particular internal chunk store organization.

As mentioned above, replicas A and B may deviate from each other due to data corruption or latency issues. With respect to data corruption, data-corruption-produced deviation between replicas may occur, for example, when disks fail, when individual sectors of a disk fail, or when stored data becomes scrambled. In addition, NAND chips (aka SSD) have progressive decay that may result in corruption of the data stored therein.

Even in the absence of any failure, replicas A and B may differ because of latency-produced deviation. Specifically, replication takes some time, and the replicas continue to evolve (i.e. new PUT operations are being done) while the replication proceeds. Thus, even if it were possible to perform an instantaneous comparison of the state of replicas A and B, the replicas would differ because some chunks that chunk store 100 has finished storing into replica A have not finished being stored into replica B by chunk store 102, and visa-versa.

It is possible to adopt protocols that attempt to pro-actively avoid corruption-produced deviations. For example, in some systems, PUT operations are sent to all replicas (e.g. all 3 replicas) but are assumed to succeed if a majority of replicas acknowledge the PUT (e.g. 2 out of 3 replicas). In the case where a replica has not acknowledged a PUT, the replication system typically exerts best efforts make sure the replica that did not acknowledge the PUT ends up having the chunk being PUT.

As another example, when a request to retrieve a chunk is made based on the access key of the chunk, the system may check whether the requested chunk was found at all replicas. If any replica failed to find the requested chunk, a copy of the chunk (obtained from a replica that succeeded in finding the chunk) may be PUT in each replica in which the retrieval operation failed.

Unfortunately, such pro-active efforts to prevent or recover from corruption-produced deviation cannot guarantee that replicas will not remain in a corrupt state indefinitely. For example, if a particular chunk becomes scrambled in replica A, then the corruption of the chunk may go undetected as long as the particular chunk is not the subject of a subsequent GET or PUT operation. Consequently, approaches have been developed for periodically checking the consistency between the replicas of a chunk set.

One approach for checking the consistency between replicas of a chunk set is referred to herein as the "ALGO1" approach. According to the ALGO1 approach, differences across two replicas are detected by comparing (a) the set of access keys of all chunks in one replica with (b) the set of access keys of all chunks in another replica, and computing the differences between the two sets. This algorithm would require transmission of O(P) access keys (where P is the number of chunks in the chunk store). With large values of P (e.g. >10**12), this is not practical.

The access keys of chunks in a replicated chunk set are often referred to as "hashes", because they are typically generated by applying a hash function to the content of chunks. The set of all hashes of a chunk store can be represented by a ring, denoting the hashes in lexicographic order. The full set of hashes (that is, the entire range of access keys) is represented by the whole ring, while a range of hashes can be represented by a slice of the ring, a "hash slice".

Referring to FIG. 3A, it is a block diagram that depicts rings 300 and 302 that respectively represent the range of access keys used by chunk stores 100 and 102. Ring 300 has been subdivided into four slices A1, A2, A3, and A4. Similarly, Ring 302 has been subdivided into four slices B1, B2, B3, and B4. Each slice represents a hash value range. In the illustrated example, rings 300 and 302 have been divided such that each slice in ring 300 has the same hash range as a corresponding slice in ring 302. Thus, slice A1 corresponds to the same hash range as slice B 1, slice A2 corresponds to the same has range as B2, etc. Two slices that correspond to the same hash range are referred to herein as a slice pair. Thus, slices A1 and B1 form a slice pair, slices A2 and B2 form a slice pair, etc. In FIG. 3A, the slice pair formed by slices A2 and B2 is identified as slice pair 304, while the slice pair formed by slices A3 and B3 is identified as slice pair 306.

Various techniques can be used to divide the ring into slices. For example, the whole ring may be subdivided in two, resulting in one slice for access keys MIN to ½MAX and one slice for access keys ½MAX+1 to MAX. If the resulting slices are not sufficiently small, then each slice may be further divided into two. This process of subdividing slices may be repeated any number of times until the slices are sufficiently small. Thus, the whole ring can be divided into 2**N hash slices, for N=0, 1, 2, etc. In FIG. 3A, the rings have been divided into four slices (i.e. N=2).

By dividing the rings 300 and 302 of chunk stores 100 and 102 into hash slices, "ALGO1" may be refined to be more efficient. The refinement "ALGO2" involves dividing the rings into 2**N hash slices, and then computing the per-slice-pair differences. For example, the access keys in slice A1 can sent from chunk store 100 to chunk store 102 to be compared to the access keys in slice B1. Then the access keys in slice A2 can be sent from chunk store 100 to chunk store 102 to be compared to the access keys in slice B2, etc. This cuts the between-store transmission of hashes into smaller packets, which is more practical, and lends itself parallelism.

Unfortunately, ALGO2 still ends up exchanging O(P) hashes, and does not focus where differences are. For example, in the extreme case where only 1 hash differs between replicas A and B, the amount of work done using ALGO2 is still O(P)—expensive. In normal operation, P is very large are there are relatively few differences.

To avoid exchanging O(P) hashes, another technique "ALGO3" uses Merkle trees (or hash trees) to compute and maintain a tree of checksums. The checksum generation technique is chosen such that two equal sets have a very low probability of being different if the checksum is the same. An example of checksum is to XOR the hashes comprising a set.

ALGO3 works per slice, first producing a checksum. If the checksum is the same for the corresponding slice in the replica, then the algorithm considers the slices are the same. If the hashes differ, hashes are enumerated, like in ALGO2. In the worst case, O(P) hashes are enumerated like in ALGO2, but in the case of just 1 hash differing, only O(P/(2N)) hashes are enumerated. For example, when split into four slices as shown in FIG. 3A, slices A2 and B2 are the only slice pair whose checksums to not match, then only the hashes that fall into slices A2 and B2 (approximately ¼ of all hashes in the replicas) need to be compared with each other. The comparison of the checksums requires O(2N) checksums to be transmitted.

Unfortunately, ALGO3 still expands a lot of energy unnecessarily. Specifically, latency-produced deviation is likely to produce many "false positives", since the checksum is designed to capture any difference with a high probability. In practice, checksums may differ for every slice-to-slice comparison unless the slices are very thin (high N). Since the enumeration of slices is O(2**N), a high N is undesirable and increases latency of the whole replication.

Another problem with ALGO 3 is that, for some areas of the hash ring, a low N would be sufficient, while some areas require a high N. These differences along the ring may arise, for example, because disks that store a certain hash range depopulate that slice that corresponds to that slice when they fail; and because replication itself tends to make the density of the slices un-even. Because the need for depth is not known ahead of time, N is rarely ideally chosen.

Further, Merkle trees are fairly expensive to maintain. A Merkle tree is updated in O(LOG(P)) time and occupies O(P) memory, and the constant factor for memory is quite high since hashes must be kept (e.g. when the checksum is a XOR of the hashes). Merkle trees are also hard to maintain incrementally across chunk stores that are unions. For example, chunk store 102 represents an overlapping union situation, where chunks for the same slice may be on both storage 112 and storage 122. The best way to compute the checksum for a slice under these circumstances is to enumerate the hashes of that slice for storage device in the union.

Consequently, it is desirable to provide techniques for efficiently detecting when and in which slices of the hash ring replicas of the same chunk set cease to match, so that the discrepancies between the replicas can be quickly corrected.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
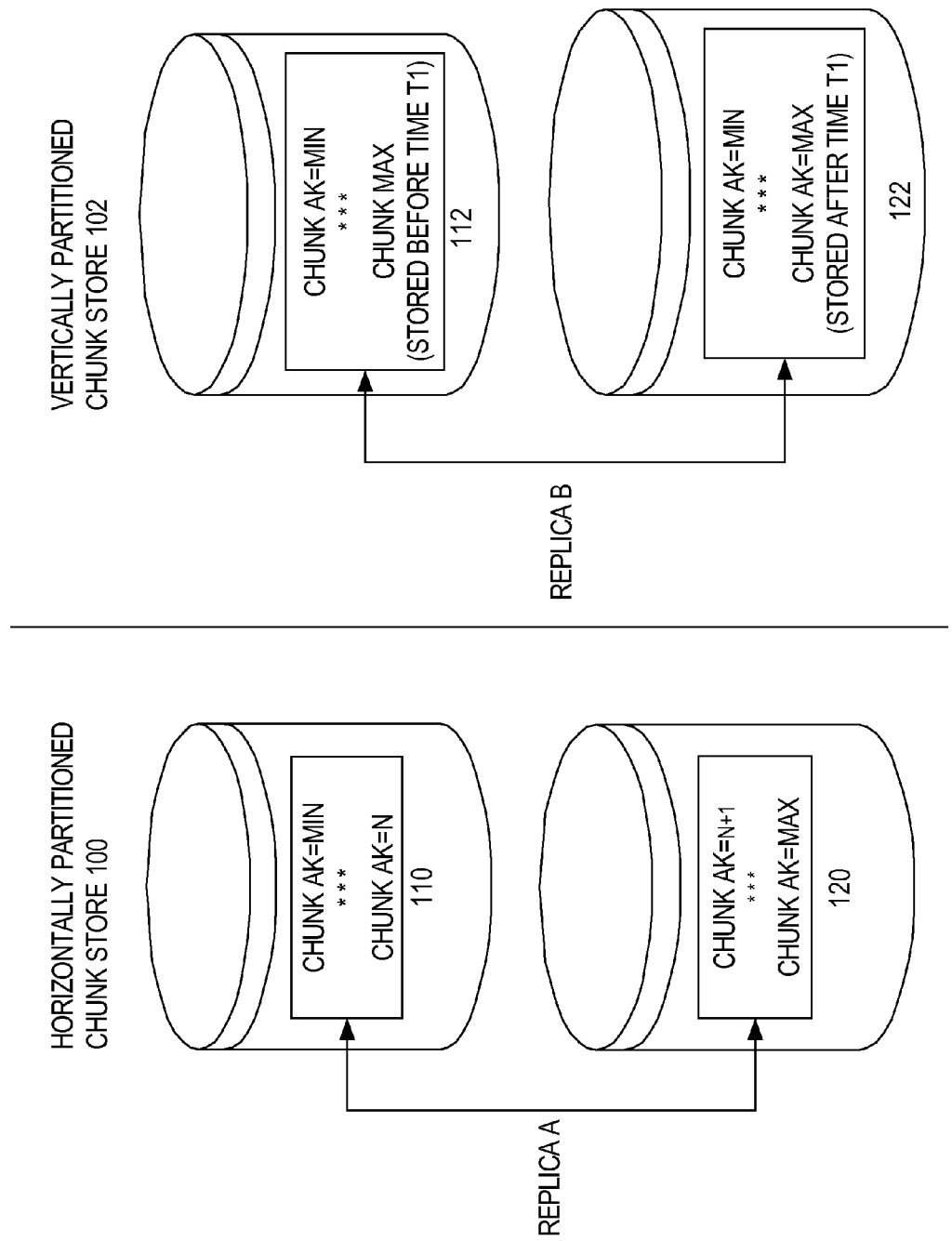
FIG. 1 is a block diagram of illustrating two chunk stores, each of which maintain a replica of the same chunk set.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for using bloom filters, rather than a Merkle tree, for efficiently identifying hash slices in which the deviation between replicas is sufficient to justify remedial measures. A bloom filter is a bit vector in which each bit corresponds to a hash bucket, and is set to "1" if any value from the input set hashes to the hash bucket. In the techniques described herein, the input set used to generate the bloom filters are the access keys (i.e. hashes), of chunks of a replicated chunk set, that fall into specific slices of the hash ring.

For example, to compare a slice A1 from replica A with the corresponding slice B1 of replica B, a bloom filter is generated for each slice in the slice pair. Specifically, a first bloom filter BF1 is generated by applying a hash function to the access keys of the chunks in slice A1, and a second bloom filter BF2 is generated by applying the same hash function to the access keys of chunks in slice B1. The bloom filters of the two corresponding slices may then be compared to each other determine whether the contents of the slices that belong to the slice pair have deviated beyond a particular threshold.

Techniques are described hereafter for adjusting the size of slices and the size of the bloom filters, so that the bloom-filter-to-bloom-filter comparison serves as an accurate indicator of whether the contents of the slices of a slice pair have deviated beyond an acceptable threshold. According to one embodiment, slice size varies from slice pair to slice pair, so that relatively sparsely populated portions of the ring (access key ranges into which fewer chunks fall) are represented by relatively larger slices, while relatively densely populated portions of the ring (access key ranges into which more chunks fall) are represented by relatively smaller slices.

Measuring Probability of Deviation

By design, bloom-filter-to-bloom-filter comparisons do not catch all deviations within a slice pair. For example, if slice A1 in replica A has a chunk with a particular access key K1 that is not included in the corresponding slice B1 of replica B, then the bloom filters for slice A1 and slice B1 will still match as long as slice B1 has at least one other chunk whose access key hashes to the same bloom filter bit as K1. Thus, use of a bloom filter allows some deviation between the chunks that belong to a slice pair before mismatches occur. The amount of deviation that can be detected by bloom filter comparisons is affected by the number (cardinality) of hashes within the slices, and the size of the bloom filters. In general, the amount of deviation that can occur before a mismatch occurs between bloom filters increases with the cardinality of the slices, and decreases in response to increasing the size of the bloom filters.

For the purpose of illustration, the bloom filter size shall be referred to herein as M. To create a bloom filter of size M, the access keys of a slice are hashed to M buckets, which correspond to M bits within the bloom filter. If M is too small, then every bit in the bloom filter will be "1", which is not useful to denote the slice. According to one embodiment, when it is determined that M is too small, it is addressed in one or both of the follow ways:

M is doubled, thereby increasing the chance zeros appear in the bloom filter.

The slice is divided in half, increasing the chance zeros appear in the bloom filters of the newly created, thinner slices.

According to one embodiment, the process of doubling M and/or subdividing the slices is repeated until the resulting slices produce bloom filters that have some zeros. Once a bloom filter has some zeros ("Z" denotes the number of zeros), the approximate cardinality of the slice for which a bloom filter is generated can be estimated using the formula:

$$\text{Approximate\_count} = -M * \text{LOG}(Z/M) \quad \text{(FORMULA 1)}$$

In addition, the probability that a bloom filter for a slice will change in response to adding, to the chunk store, D items whose access keys fall into the slice is:

$$P = 1 - (1 - Z/M)^{**D} \quad \text{(FORMULA 2)}$$

Further, for a given slice of size M, if 2 replicas have bloom filters with respectively Z1 zeros and Z2 zeros, the probability the 2 replicas differ for that slice by at least D elements is roughly:

$$P = 1 - (1 - Z/M)^{**D} \text{ (with } Z = \text{MIN}(Z1, Z2)) \quad \text{(FORMULA 3)}$$

Determining which Slice Pairs are Deviant

As explained above, it is important to efficiently identify which slices pairs, of repositories that replicate the same chunk set, have deviated beyond a certain threshold. Those slice pairs are referred to herein as "deviant slice pairs". Based on the formulas set forth above, bloom filters may be used to identify the deviant slice pairs of a replicated chunk set.

Figure 2A:
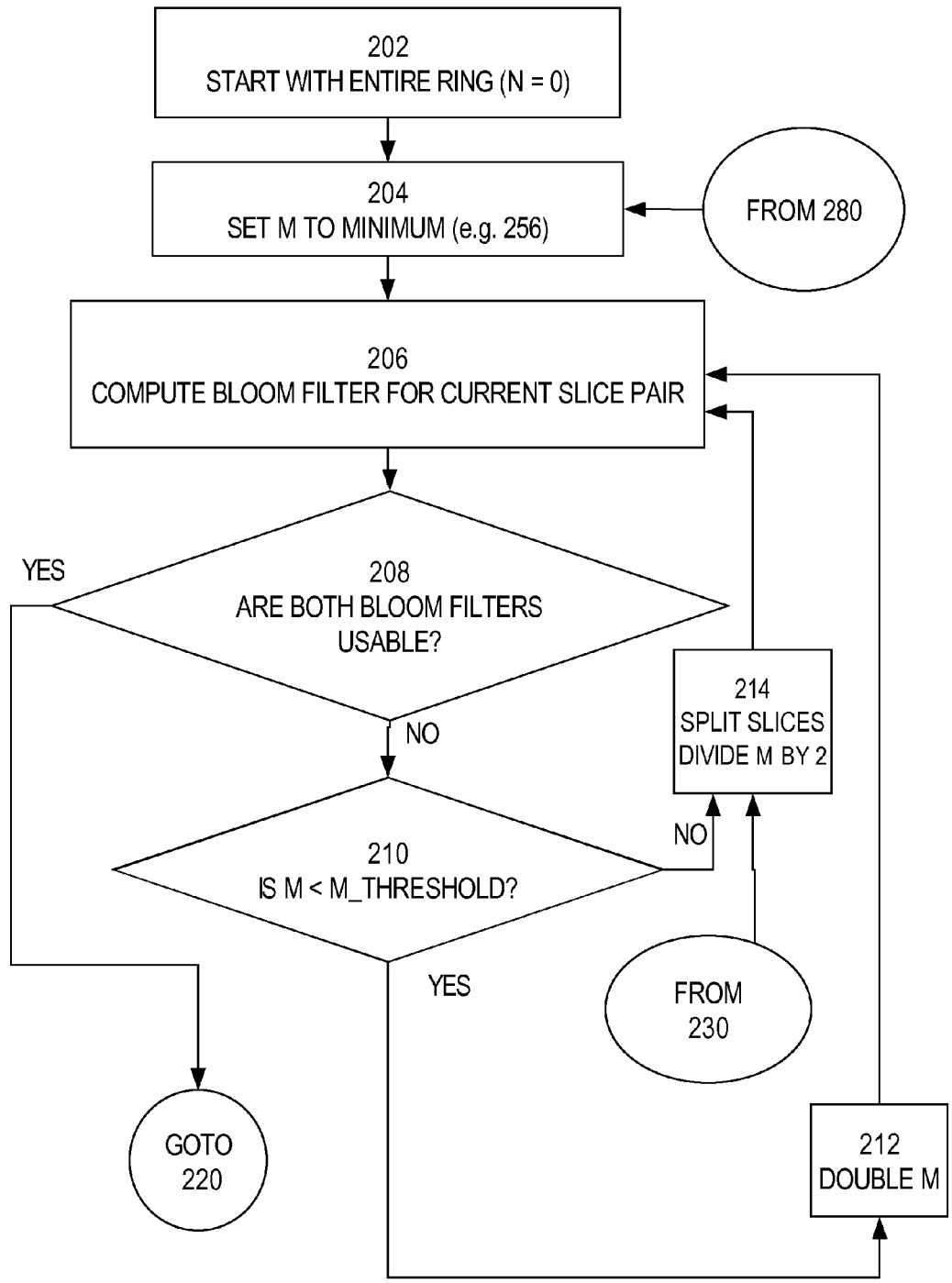
FIGS. 2A-2B are a flowchart illustrating steps for detecting deviation between replicated chunk sets based on bloom filters, according to an embodiment of the invention.
Figure 2B:
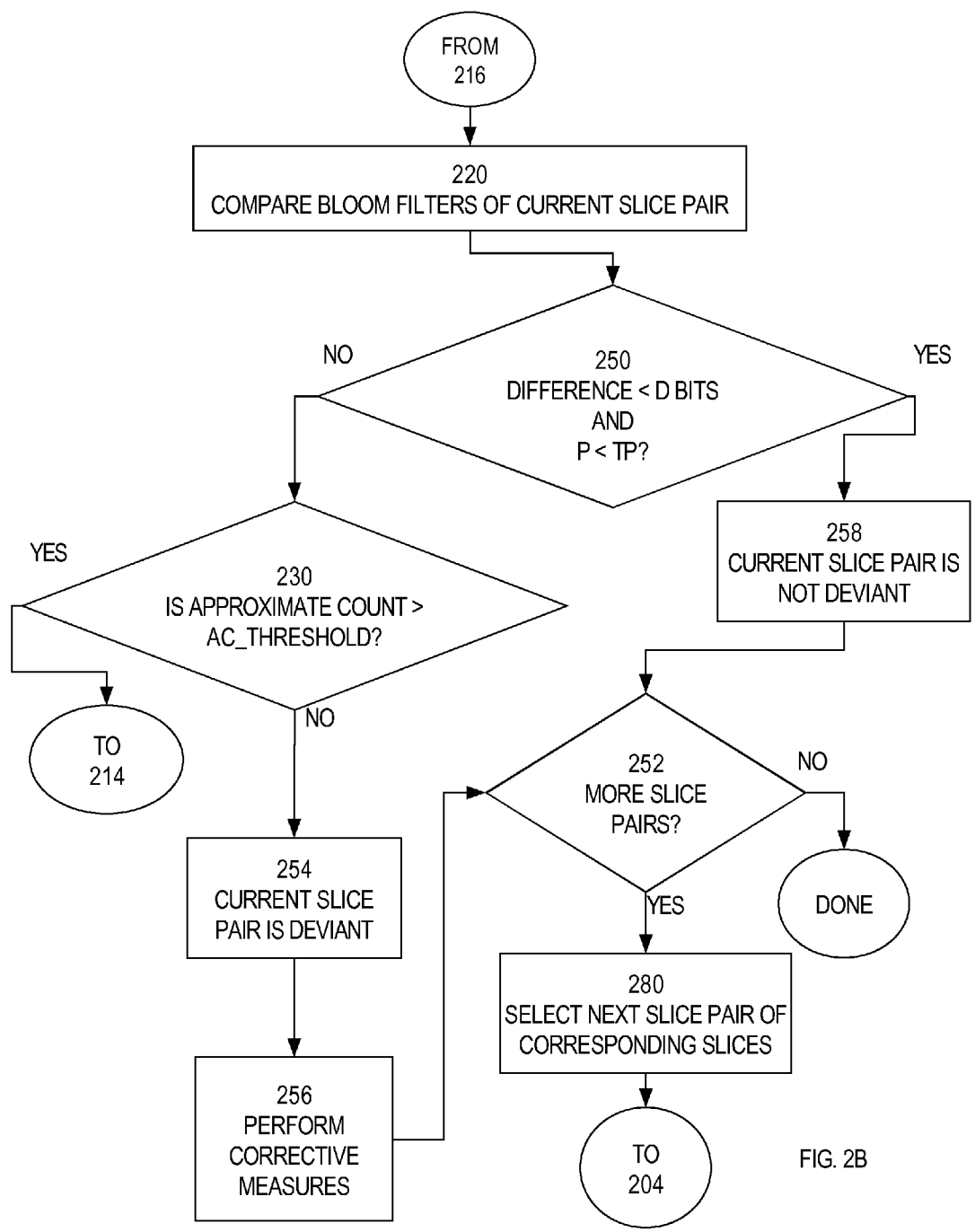

FIGS. 2A and 2B are a flowchart illustrating how bloom filters may be used to efficiently identify deviant slice pairs according to one embodiment. In the embodiment illustrated in FIGS. 2A and 2B, the threshold above which slice pairs are considered deviant is represented by two parameters: D and TP. D is the minimal number of items that must differ between two corresponding slices before they are considered deviant, and TP is the target probability that the two slices differ by D items.

Figure 3A:
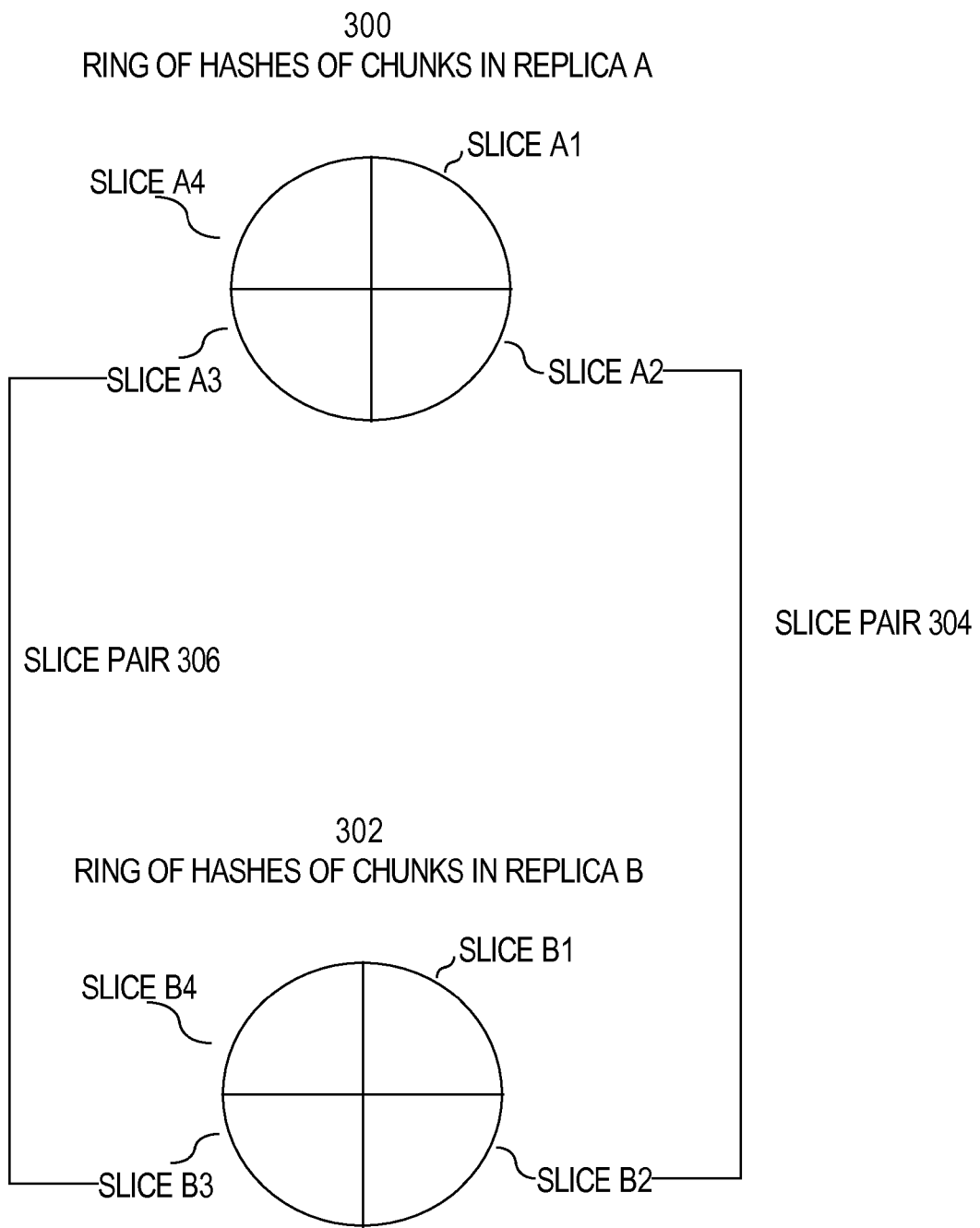
FIG. 3A is a block diagram of the rings associated with the chunk stores illustrated in FIG. 1.
Figure 3B:
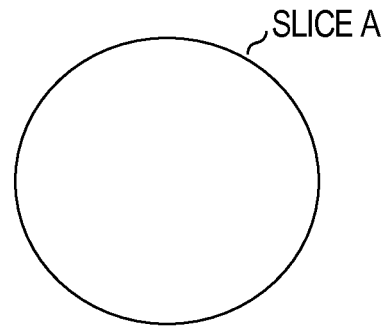
FIGS. 3B-3E are block diagrams illustrating how the ring of a replicated chunk store may be subdivided into slices to detect deviation using bloom filters, according to an embodiment of the invention.
Figure 3B:
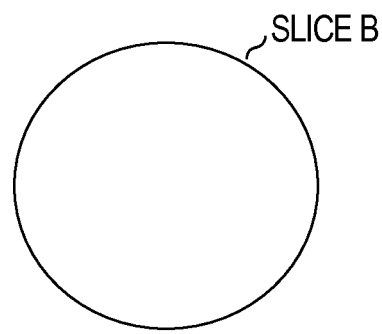

Referring to FIG. 2A, at step 202, the entire ring is initially established as the "current slice pair". That is, the ring itself is treated as a single slice (N=0). This division of rings 300 and 302 is illustrated in FIG. 3B, where each of rings 300 and 302 corresponds to a single slice (slices A and B, respectively).

At step 204, the initial size of the bloom filter is set to a relatively small value (e.g. 256). After the initialization steps 202 and 204, control passes to step 206 in which bloom filters are generated for the slices that belong to the current slice pair.

Because the current slice pair is initially the entire ring, the first iteration of step 206 involves (a) generating a first bloom filter BF1, 256 bits wide, based on the access keys of all of the chunks in replica A, and (b) generating a second bloom filter BF2, 256 bits wide, based on the access keys of all of the chunks in replica B.

In step 208, it is determined whether both bloom filters are usable. A bloom filter is not usable, for example, if all bits in the bloom filter are 1s. Because the current slice pair is the entire ring (i.e. covers all chunks in each replica), and the bloom filters are relatively small, it is likely that in the first iteration of step 208, the bloom filters are not useable. That is, each replica is likely to have at least one chunk with an access key that falls into each hash bucket of the 256 hash buckets that correspond to the bits in the bloom filter.

If the bloom filters are not usable, then at step 210 it is determined whether M is above a threshold (M_theshold). M_threshold is the maximum acceptable size of the bloom filters. The maximum acceptable size for bloom filters will vary based on the capabilities of the systems involved. For the purpose of illustration, it shall be assumed that M_threshold is $2**20$ bits. However, the techniques described herein are not limited to any particular value of M_theshold.

In the first iteration M is 256 bits, which is less than $220$, so control proceeds from step 210 to step 212. At step 212, M is doubled, and then control proceeds back to step 206. Thus, steps 206, 208, 210 and 212 form a loop that is repeated until either M reaches M_threshold, or the bloom filters produced at step 206** are useable.

For the purpose of illustration, it shall be assumed that M reaches M_threshold before the bloom filters are usable. Consequently, control passes to step 214 in which the slices that belong to the current slice pair are split in two, and M is divided by 2. Assuming that M_threshold is $220$, at step 214 M will be set to $219$.

Figure 3C:
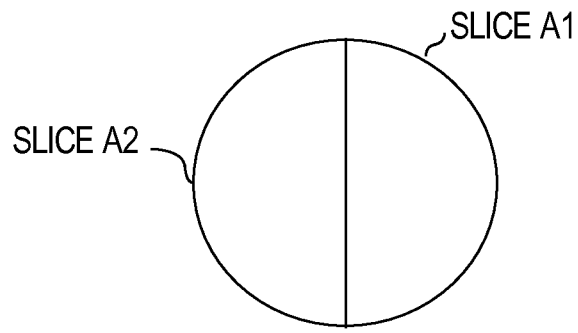
Figure 3C:
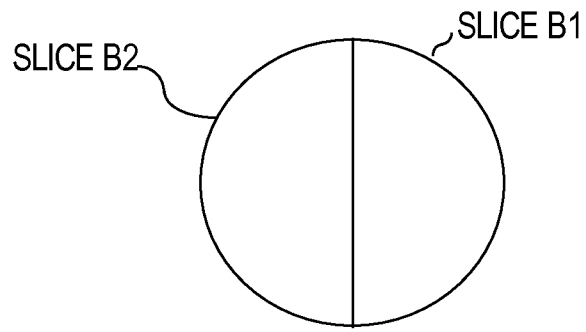

In the first iteration of step 214, slices A and B are divided into two slices: a first slice covering the first half of the access key value range of the split slice, and a second slice covering the second half of the access key value range of the split slice. FIG. 3C illustrates the scenario in which slices A and B have been respectively divided into slices A1, A2, and slices B1, B2.

The current slice pair is then established to be the newly-created slices (one from each ring) that cover the first half of the access key value range of the split slices. Thus, in the present example, slices A1 and B1 will be established as the current slice pair. Control then passes back to step 206.

At step 206, bloom filters are generated for the slices that belong to the current slice pair. Because the current slice pair is now the first half of the ring, step 206 involves generating a bloom filter based on slice A1 (i.e. the access keys the chunks in replica A that fall into the first half of the access key range), and generating a second bloom filter based on slice B1 (i.e. the access keys of all of the chunks in replica B that fall into the first half of the access key range).

Figure 3D:
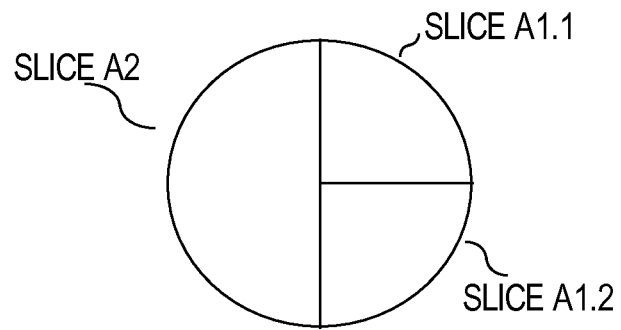
Figure 3D:
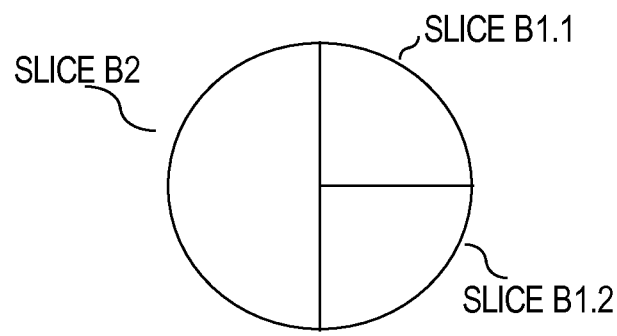

In step 208, it is determined whether both bloom filters are usable. If the bloom filters are not usable, then control passes to steps 210 and 212, where M is doubled (returning M to M_theshold). At step 206, new bloom filters are generated for slices A1 and B1 using the new value of M. If the bloom filters are still unusable 208, control passes to steps 210 and 214, where the slices that belong to the current slice pair are divided again. In the present example, slices A1 and B1 are respectively divided into slices A1.1, A1.2, and B1.1, B1.2, as illustrated in FIG. 3D.

Thus, steps 206, 208, 210, 212 and 214 form a loop during which the slices that belong to the current slice pair are repeatedly cut in half, while M fluctuates between M_threshold and M-theshold/2, until both bloom filters are usable. For the purpose of illustration, it shall be assumed that the bloom filters of slices A1.1 and B1.1 are usable when M=M_theshold. Consequently, control passes from step 208 to step 220 (FIG. 2B).

At step 220, the bloom filters of the current pair are compared with each other to determine the number of bits by which the bloom filters differ. At step 250, it is determined whether that difference in bits is less than D (the minimal number of items that must differ between two corresponding slices before they are considered deviant), and whether P (the probability the chunks that correspond to the current slice pair differ by at least D items) is less than TP (the target probability that the two slices differ by D items). Given D, the value of P may be computed using FORMULA3, set forth above.

If DIFFERENCE>D and P<TP, then the current slice pair is not considered deviant (step 258). Processing is then complete for the current slice pair, so at step 252 it is determined whether any unprocessed slices remain. For the purpose of explanation, it shall be assumed that the comparison of bloom filters of A1.1 and B1.1 satisfies the test performed in step 250, so the current slice pair is not considered deviant in step 258.

In step 252, it is determined that more slice pairs need to be processed. Specifically, in the present example, slice pair A1.2/B1.2 and slice pair A2/B2 have not yet been processed. Therefore, at step 280, the next slice pair (e.g. A1.2/B1.2) is selected for processing, and control returns to step 204 (FIG. 2A).

Figure 3E:
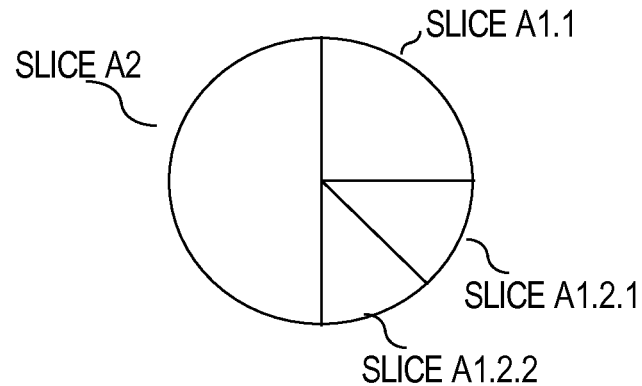
Figure 3E:
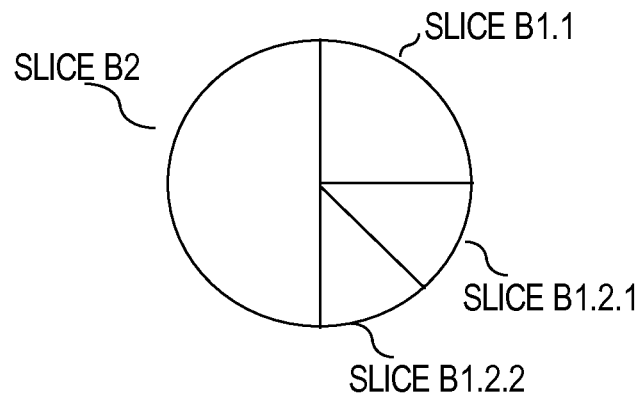

The loop defined by steps 206 to 214 is then repeated, first doubling M, then subdividing the current slice pair, until usable bloom filters are produced. For the purpose of illustration, it shall be assumed that, to obtain usable bloom filters that pass the approximate count test, slices A1.2 and B1.2 have to be divided once, thereby producing slices A1.2.1, A1.2.2, and B1.2.1, B1.2.2, as illustrated in FIG. 3E.

Thus, the second time control passes from step 208 to step 220, the current slice pair is composed of slices A1.2.1 and B1.2.1. At step 220, the bloom filters of slices A1.2.1 and B1.2.1 are compared, and at step 250 it is determined whether the difference in bits of the bloom filters is less than D, and whether P is less than TP.

For the purpose of illustration, it shall be assumed that the bloom filters for slices A1.2.1 and B1.2.1 do not satisfy the tests performed in step 250. Therefore, control passes to step 230. At step 230, it is determined whether the approximate count for the current slice is greater than a particular threshold (AC_threshold). In one embodiment, the approximate count is determined based on FORMULA1, set forth above. If the approximate count is greater than AC_threshold, then the cardinality of the slices that belong to the current slice pair is too high (i.e. the hash range covers the access keys of too many chunks). Under those circumstances, control passes back to step 214 where the slices that belong to the current slice pair are split, and M is divided by 2.

On the other hand, if at step 230 the approximate count is less than the threshold, then at step 254 the current slice is considered deviant, and at step 256, corrective measures are taken. The corrective measure may involve, for example, comparing the access keys of replica A that fall into the current slice with the access keys of replica B that fall into the current slice, (as in ALGO2 described above). Control then passes to step 252, where it is determined whether any slices remain to be processed.

By employing the techniques described herein, the process of subdividing the ring may stop at different levels for different parts of the hash ring. For example, it is possible for the final division of the ring to be as illustrated in FIG. 3E, where one slice covers half the ring, one slice covers a quarter of the ring, and two slices each cover one eighth of the ring. This may be the case, for example, when replicas A and B have significantly more chunks that fall into some hash ranges than they have in other hash ranges.

Threshold Deviation Parameters

As mentioned above, the deviant slice pair process illustrated in FIGS. 2A and 2B is parameterized by a threshold for detection of D differences, and TP probability. Consequently, the process lets replication "forget" the noise due to small differences that will be resolved naturally with a bit of time (e.g. latency-produced deviation).

The amount of deviation that should be allowed may vary from system to system, based on characteristics such as the size of the replicated chunk set and the amount of latency experienced under normal operating conditions. While a specific technique has been described that uses D and TP as parameters for specifying the acceptable amount of deviation, alternative embodiments may use different parameters for indicating the threshold.

Subdividing Slices

In the embodiment illustrated in FIGS. 2A and 2B, when a slice is too big (either because the slice produces an unusable bloom filter when M is at M_threshold or because the approximate count>AC_threshold), the slice is divided in two and M is halved. The result of these two operations produces a bloom filter in the next iteration that has the same "effectiveness" as the previous iteration. When the slice is homogeneous, the size of the bloom filter will probably end up being doubled again for each of the 2 sub-slices. However, when the sub-slices differ unevenly from the other replica, the process will do more work for the sub-slice that differs more than for the sub-slice that differs less.

Dividing the current slice pair in two, and dividing M by two, is merely one example of an action that may be taken when it is determined that the current slice pair is too large. For example, in alternative embodiments, the slice pair can be divided into X slices, and M can be divided by X. For example, in the case where X is 4, step 214 may involve dividing the slices in the current pair into four slices, and dividing M by 4.

In some embodiments, the amount of sub-slices into which slices are sub-divided is not the same number that is used to divide M. For example, the slices may be divided into 4, while M is merely divided by 2.

In yet another embodiment, the number of slices into which a too-big slice is subdivided may vary based on various factors. For example, if the approximate count is more than twice AC_threshold, then the slices may be subdivided by 4. On the other hand, if the approximate count is more than AC_threshold but less than twice AC_threshold, then the slices may be subdivided by 2.

Near-Full Bloom Filters

In the embodiment illustrated in FIGS. 2A-2B, the bloom filters start "useless" (all 1s), and are only used when zeros start appearing. Doubling the size of the bloom filters (M) will quickly increase the number of zeros, making the bloom filter more effective, but at greater transmission cost. In one embodiment, bloom filters are used when they have a few zeros, which guarantees they remain small, but provide enough information to compute cardinality of the sets and differences between two bloom filters. This differs fundamentally from the usual way bloom filters are used (i.e. near-empty).

In an embodiment where too-big slices are sub-divided, the embodiment in essence creates a hierarchy of bloom filters, refining them until they become useful. The bloom filters thus created can be efficiently computed on union stores by ORing the bloom filters of the stores that belong to the union. For example, the bloom filter for the entire ring of replica A may be computed by (a) generating a first bloom filter based on the access keys of the chunks on storage 110, (b) generating a second bloom filter based on the access key of the chunks on storage 120, and (c) ORing the first and second bloom filters.

When the distribution is uniform along the ring (worst case), the number of bits required for all the bloom filters across all the slices will be O(P), but with a very small O compared to a technique that uses Merkle trees.

Determining Deviation Based on Interval Boundary

When a bloom filter is constructed for a slice in the manner described above, each zero in the bloom filter of the slice indicates that the slice contains no chunks with access keys that hash to the bit position of the zero. When a new chunk is added whose access key (a) falls within the slice, and (b) hashes to the position of a bloom filter bit that is currently zero, the bloom filter bit at that position changes from zero to 1. Thus, adding new chunks to a slice eventually flips zeros to ones within the slice's bloom filter.

For the purpose of explanation, the following terms shall be used:
  "z0"=the number of zero bits in a bloom filter of a slice before chunks are added
  "delta"=the number of bits in the bloom filter of the slice that change from zero to one because the new chunks are added
  "z1"=the number of zero bits in the bloom filter of the slice after the chunks are added
  "d"=the number of chunks that were added to cause delta bits of the bloom filter to flip from zero to one Based on these definitions, z1=z0−delta. Stated another way, after chunks are added, a bloom filter for a slice has "delta" fewer zeros than it had before the chunks were added.

According to one embodiment, 'd' is the main measure of the number of differences between slices, and may be estimated based on z0, z1, delta, and M. Specifically, d may be estimated based on the distribution of possible values for d that result in a particular value of delta. The central (most probable) value is d=m·log(1+delta/z1), where log is the natural logarithm.

However, under some circumstances, this central value is not sufficiently accurate, as there is a natural distribution around it. For example, if delta=0 (i.e. no differences occur between the bloom filters), the most likely value for d is 0, though a value of d=1, or d=2, or even d=100 could perfectly result in delta=0 observed differences, with various probabilities.

Because of the potential inaccuracy of using a single value for d, in one embodiment, an interval of values is computed for d that captures a target percentage of cases. For the purpose of explanation, an interval that captures at least 99.7% of cases (3 standard deviations from the mean) is used. The upper bound of this interval may then be used to drive an algorithm for determining whether two replica portions that correspond to the slices in a slice pair have deviated from each other by more than a particular threshold. One such algorithm is illustrated in FIG. 5.

Figure 5:
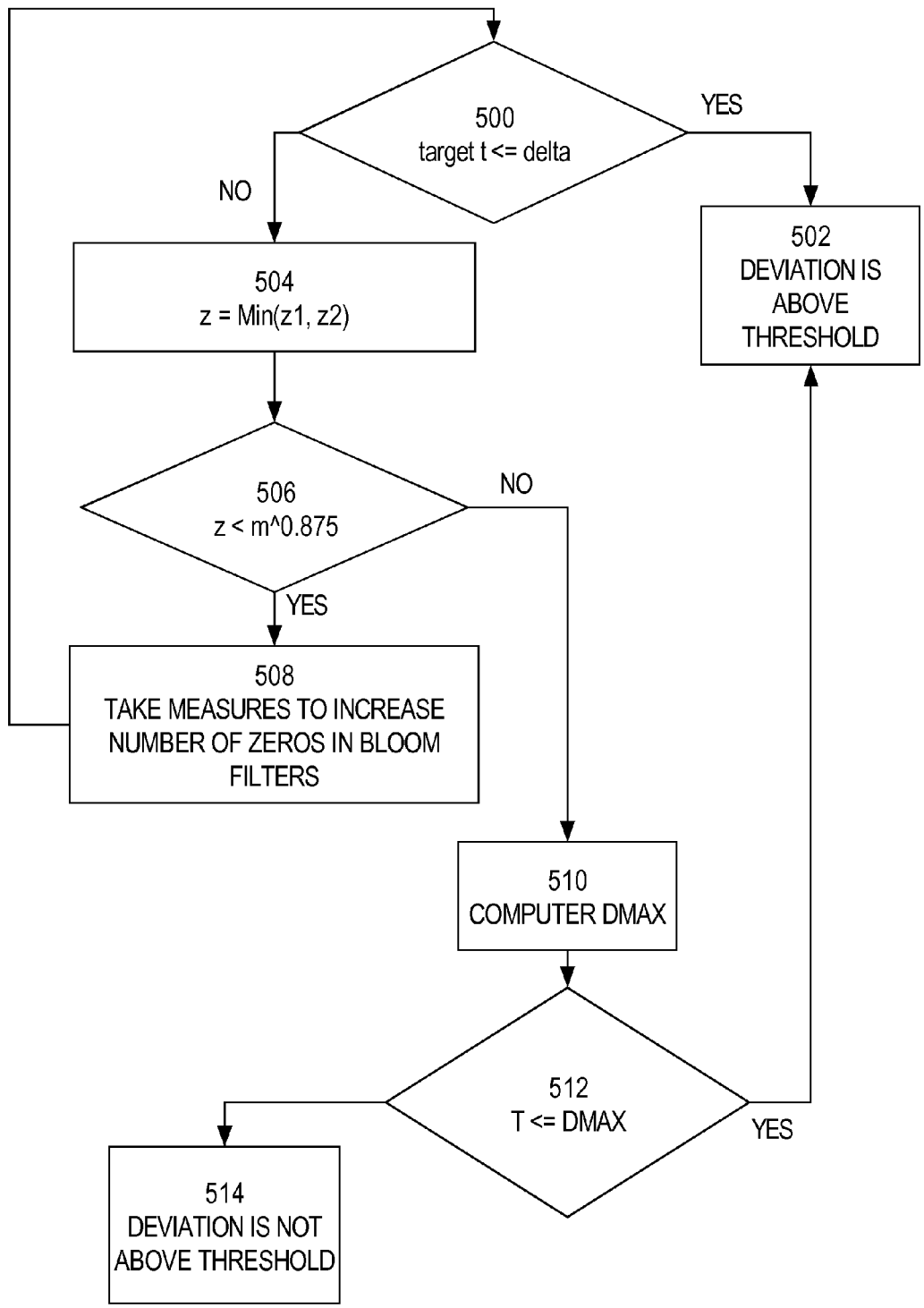
FIG. 5 is a flowchart illustrating how to determine whether the replica portions that correspond to a slice pair have deviated from each other by more than a particular threshold, according to one embodiment.

Referring to FIG. 5, it is a flowchart for determining whether two replica portions that correspond to the slices in a slice pair have deviated from each other by more than a particular threshold, according to an embodiment that uses the upper bound of the interval described above. Specifically, the steps illustrated in FIG. 5 determine whether the actual differences d between the two bloom filters of a slice pair is less than some target 't' with 99.7% probability, given m, z0, z1, and delta (which is simply z0−z1).

Referring to FIG. 5, at step 500 it is determined whether the target t<=delta. The number of true differences d is always greater than delta, so t<=delta<=d. Consequently, if the number of zeros that have flipped (delta) is equal to or greater than the threshold (target t), then the actual deviation is necessarily greater than threshold. Consequently, control passes to step 502, where it is determined that the deviation is greater than the threshold.

On the other hand, if the target t is greater than delta, control passes to step 504. At step 504, z is established to be Min(z1, z2). At step 506, z is compared with m^0.875. If z is less than this value, then it is determined that the current slice pair includes too many chunks (i.e. the bloom filters have too few zeros to give reliable information). If the bloom filters have too few zeros, M is increased and/or the slices are divided to increase the density of zeros in the bloom filters, as explained in detail in relation to steps 210, 212 and 214 of FIG. 2.

If z is greater than m^0.875, then control passes to step 510 where dmax is computed. Dmax is the upper boundary of the interval that has a certain percentage probability of including the actual value d, as explained above. In one embodiment, the target probability is selected to be 99.7%. A method of calculating dmax is explained below with reference to FIG. 6. However, the techniques described herein are not limited to any particular method of calculating dmax.

At step 512, t is compared to the dmax computed in step 510. If t<=dmax, then control passes from step 512 to at step 502 and the deviation between the chunk set portions that correspond to the current slice pair is determined to be above the threshold. On the other hand, if t is greater than dmax, then control passes to step 514 and the deviation between chunk set portions that correspond to the current slice pair is determined to be below the threshold.

Calculating dmax

As explained above, dmax is the upper boundary of the interval that has a selected probability (e.g. 99.7% chance) of including the actual value of d for a given value of "delta" and a given value of "M".

P is the probability that, given alpha and delta observed differences between the bloom filters, the two slices had exactly d differences. In one embodiment, the formula for this probability is obtained from basic combinatorics, in this case the binomial distribution. In particular, the probability is equal to: C(d, delta)*alpha^delta*(1−alpha)^(d−delta)

where C(d, delta) is the number of ways of picking delta objects out of d. According to one embodiment, the formula to compute C(d, delta) is:

$$C(d, \text{delta}) = d!/(\text{delta}!*(d-\text{delta})!)$$

where n! is the factorial of n, i.e. the product of all integers from 1 to n: n!=1*2*3 . . . *n.

Figure 6:
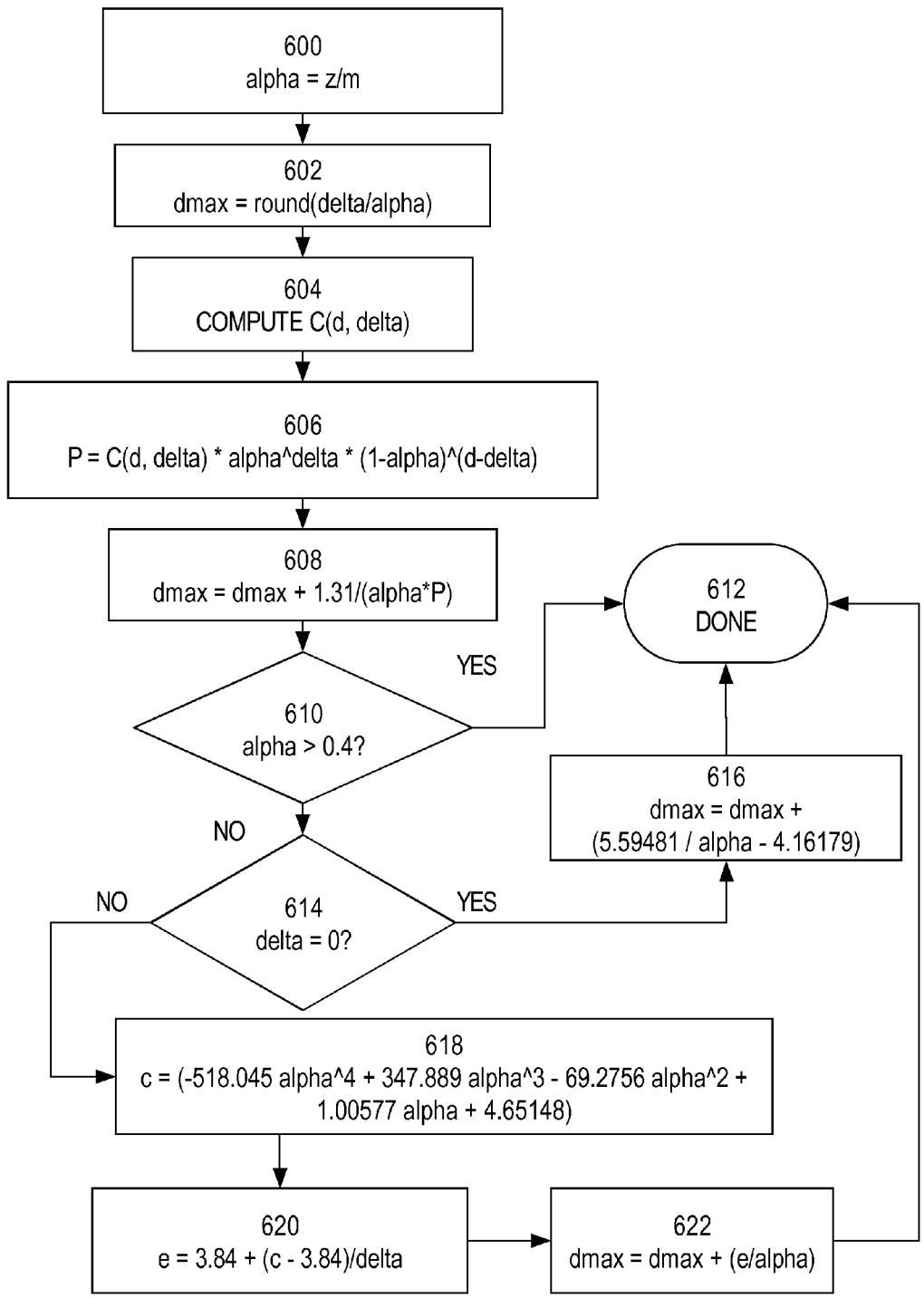
FIG. 6 is a flowchart illustrating how to calculate dmax (the upper boundary of the interval that has a certain percentage probability of including the actual number of chunks that differ between a slice pair), according to an embodiment.

Because the expression does not have a closed mathematical form, the steps illustrated in FIG. 6 provide a good numerical approximation of dmax over the full range of values for alpha and delta. In particular, at step 604, C(d, delta) is computed, wherein C(d, delta) is the number of combinations of delta choices out of d elements.

Referring to FIG. 6, at step 600 the ratio of z (the number of zero bits in a bloom filter) to m is determined. That ratio is referred to herein as "alpha". The value of alpha will between 0 and 1, where alpha=0 for a bloom filter with no zeros, and alpha=1 for a bloom filter of all zeros.

At step 602, dmax is initially established to be delta/alpha, rounded to the nearest integer.

At step 606, P is computed to be C(d, delta)*alpha^delta* (1−alpha)^(d−delta).

At step 608, the current value of dmax is increased by 1.31/(alpha*P).

At step 610, it is determined whether alpha is greater than 0.4. If alpha is greater than 0.4, then process is done (step 612).

On the other hand, if, at step 610, it is determined that alpha is not greater than 0.4, then control passes to step 614 where it is determined whether delta is zero. If delta=0, then at step 616 (5.59481/alpha−4.16179) is added to dmax.

If at step 614 delta>0, then at step 618 c is set to (−518.045 alpha^4+347.889 alpha^3−69.2756 alpha^2+1.00577 alpha+ 4.65148).

At step 620, e is set to 3.84+(c−3.84)/delta.

At step 622, dmax is increased by (e/alpha).

Alternatives

The embodiment illustrated in FIGS. 2A and 2B is merely one example of how bloom filters may be used to identify deviation between the replicas of a chunk set. For example, in an alternative embodiment, an effort is first made to prioritize which sub-slice to focus on, by using FORMULA3 to order which slices to work on first.

In other embodiments, too-big slices may be handled by a process that decides between doubling M or dividing a slice in two based on various factors. In one embodiment, M may remain fixed, and only slices are subdivided. In yet another embodiment, the slice sizes may remain fixed, and M is doubled as needed, without limit.

Further, as mentioned above, slices do not have to be power of 2 fractions of the hash ring. Thus, when subdivided, slices may be subdivided in any way. Further, M can be increased in other ways than doubling. For example, the size increase of M may be based, for example, on the bloom filter size that has produced usable bloom filters for similarly-sized slices.

In the embodiment illustrated in FIGS. 2A and 2B, M is set to the same minimum at the start of testing each new slice pair. However, in an alternative embodiment, after a certain number of slice pairs have been tested, the minimum used in step 204 may be increased. For example, assume that after processing one fourth of the ring, the smallest usable bloom filter had 1024 bits, then the minimum used at step 204 may be increased to 512 (half the size of the smallest previously-encountered usable bloom filter).

As yet another alternative, D need not remain constant over all slices. Thus, different terminations of the process is possible, for example, by making D vary as a function of slice size. In other embodiments, near-full bloom filters are used to identify deviation among slices of replicas using various algorithms that recurse differently than those algorithms described above. Thus, the techniques described herein are not limited to any particular recursive algorithm, but are applicable to any cases where near-full bloom filters are used to make decisions on what portion of the hash ring has experience sufficient deviation between replicas to merit a remedial action.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

The special-purpose computing devices may be desktop computer systems, portable computer systems, handheld devices, networking devices or any other device that incorporates hard-wired and/or program logic to implement the techniques. Any portable device with computing ability may be used to implement the techniques described herein, including but not limited to mobile devices such as tablets, cell phones, PDAs, etc.

Figure 4:
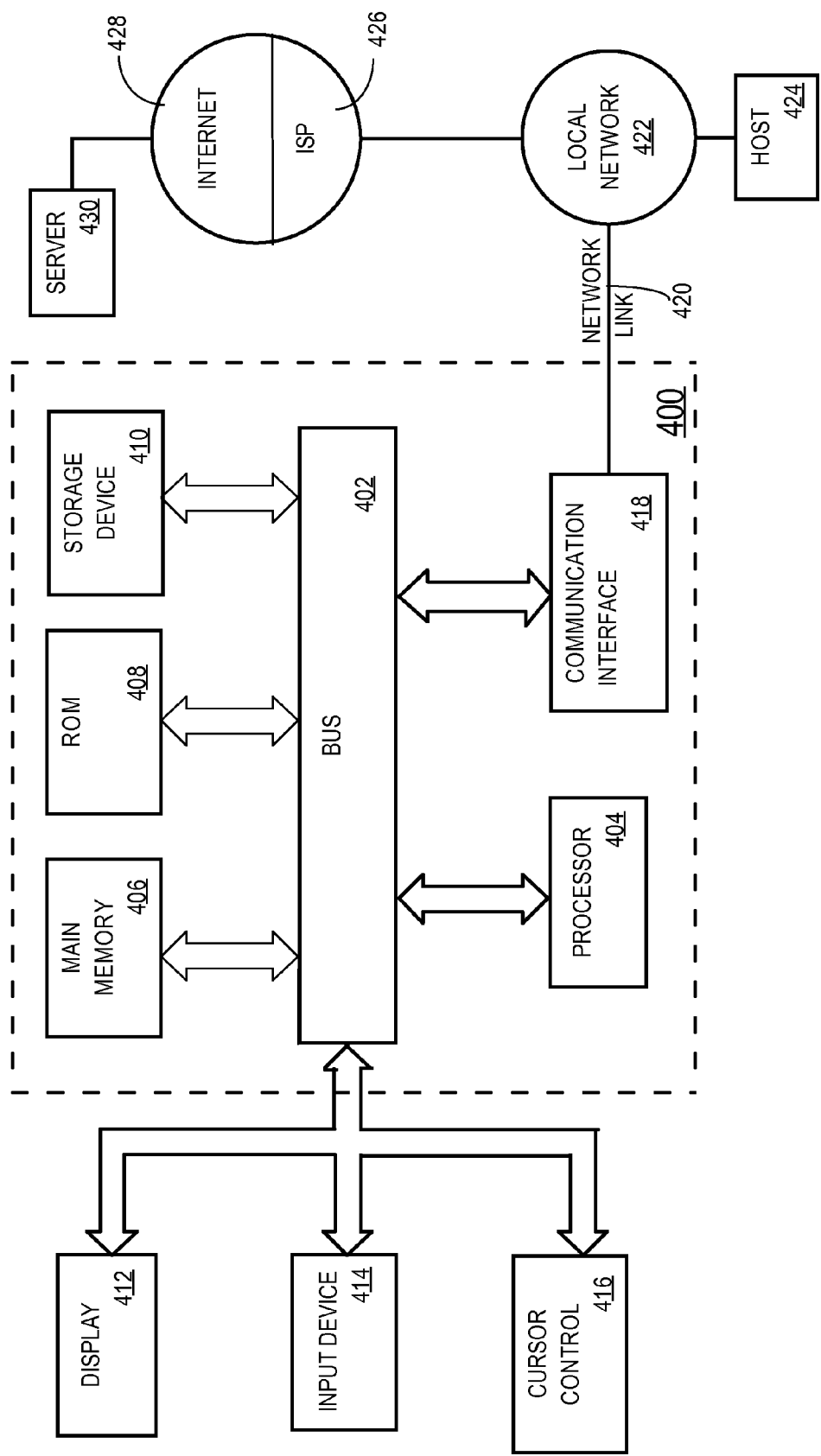
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage unit, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage unit coupled to bus 402 for storing static information and instructions for processor 404. A storage unit 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage unit 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage unit 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage unit 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage unit 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating a first bloom filter based on access keys that fall into a first slice;
   wherein the first slice corresponds to a first portion of a first replica of a chunk set;
   generating a second bloom filter based on access keys that fall into a second slice;
   wherein the second slice corresponds to a second portion of a second replica of the chunk set;
   performing a comparison between the first bloom filter and the second bloom filter;
   based on the comparison, determining whether the first portion of the first replica has deviated from the second portion of the second replica by more than a particular threshold;
   wherein the method is performed by one or more computing devices.

2. The method of claim 1 further comprising:
   determining that slices that belong to a particular slice pair are too big;
   in response to determining that slices that belong to a particular slice pair are too big, dividing each of the slices that belong to the particular slice pair into a plurality of sub-slices;
   wherein the plurality of sub-slices include the first slice and the second slice.

3. The method of claim 2 wherein the step of determining that slices that belong to the particular slice pair are too big includes determining that bloom filters produced by the slices that belong to the particular slice pair have too few zeros.

4. The method of claim 2 wherein the step of determining that slices that belong to the particular slice pair are too big includes:
   estimating a cardinality of the slices that belong to the particular slice pair; and
   determining the cardinality exceeds a particular threshold.

5. The method of claim 1 wherein determining whether the first portion of the first replica has deviated from the second portion of the second replica is based, at least in part, on how many bits differ between the first bloom filter and the second bloom filter.

6. The method of claim 1 further comprising:
   determining that slices that belong to a particular slice pair are too big based on bloom filters generated for the particular slice pair;
   wherein the bloom filters generated for the particular slice pair have a first size;
   in response to determining that slices that belong to a particular slice pair are too big, dividing each of the slices that belong to the particular slice pair into a plurality of sub-slices;
   wherein the plurality of sub-slices include the first slice and the second slice; and
   wherein the first bloom filter and the second bloom filter have a second size that is smaller than the first size.

7. The method of claim 6 wherein the slices that belong to the particular slice pair are determined to be too big based on the bloom filters, generated for the particular slice pair, having too few zeros.

8. The method of claim 1 further comprising:
   generating a third bloom filter based on access keys that fall into the first slice;
   generating a fourth bloom filter based on access keys that fall into the second slice;
   based on the third and fourth bloom filters, determining whether to increase the size of bloom filters used to compare the first slice and the second slice;
   wherein the first and second bloom filters are generated in response to determining that the size of bloom filters used to compare the first slice and the second slice should be increased;
   wherein the first and second bloom filters are larger than the third and fourth bloom filters.

9. The method of claim 8 wherein determining whether to increase the size of bloom filters used to compare the first slice and the second slice is based, at least in part, on how many zeros are in the third and fourth bloom filters.

10. The method of claim 1 further comprising, in response to determining that the first portion of the first replica has deviated from the second portion of the second replica by more than a particular threshold, performing a corrective measure to reduce deviation between the first portion and the second portion.

11. The method of claim 10 wherein the corrective measure includes comparing access keys of chunks that belong to the first portion with access keys of chunks that belong to the second portion.

12. A non-transitory computer-readable medium storing instructions which, when executed by one or more processors, cause performance of a method comprising:
   generating a first bloom filter based on access keys that fall into a first slice;
   wherein the first slice corresponds to a first portion of a first replica of a chunk set;
   generating a second bloom filter based on access keys that fall into a second slice;
   wherein the second slice corresponds to a second portion of a second replica of the chunk set;
   performing a comparison between the first bloom filter and the second bloom filter; and based on the comparison, determining whether the first portion of the first replica has deviated from the second portion of the second replica by more than a particular threshold.

13. The non-transitory computer-readable medium of claim 12 wherein the method further comprises:
    determining that slices that belong to a particular slice pair are too big;
    in response to determining that slices that belong to a particular slice pair are too big, dividing each of the slices that belong to the particular slice pair into a plurality of sub-slices;
    wherein the plurality of sub-slices include the first slice and the second slice.

14. The non-transitory computer-readable medium of claim 13 wherein the step of determining that slices that belong to the particular slice pair are too big includes determining that bloom filters produced by the slices that belong to the particular slice pair have too few zeros.

15. The non-transitory computer-readable medium of claim 13 wherein the step of determining that slices that belong to the particular slice pair are too big includes:
    estimating a cardinality of the slices that belong to the particular slice pair; and
    determining the cardinality exceeds a particular threshold.

16. The non-transitory computer-readable medium of claim 12 wherein determining whether the first portion of the first replica has deviated from the second portion of the second replica is based, at least in part, on how many bits differ between the first bloom filter and the second bloom filter.

17. The non-transitory computer-readable medium of claim 12 wherein the method further comprises:
    determining that slices that belong to a particular slice pair are too big based on bloom filters generated for the particular slice pair;
    wherein the bloom filters generated for the particular slice pair have a first size;
    in response to determining that slices that belong to a particular slice pair are too big, dividing each of the slices that belong to the particular slice pair into a plurality of sub-slices;
    wherein the plurality of sub-slices include the first slice and the second slice; and
    wherein the first bloom filter and the second bloom filter have a second size that is smaller than the first size.

18. The non-transitory computer-readable medium of claim 17 wherein the slices that belong to the particular slice pair are determined to be too big based on the bloom filters, generated for the particular slice pair, having too few zeros.

19. The non-transitory computer-readable medium of claim 12 wherein the method further comprises:
    generating a third bloom filter based on access keys that fall into the first slice;
    generating a fourth bloom filter based on access keys that fall into the second slice;
    based on the third and fourth bloom filters, determining whether to increase the size of bloom filters used to compare the first slice and the second slice;
    wherein the first and second bloom filters are generated in response to determining that the size of bloom filters used to compare the first slice and the second slice should be increased;
    wherein the first and second bloom filters are larger than the third and fourth bloom filters.

20. The non-transitory computer-readable medium of claim 19 wherein determining whether to increase the size of bloom filters used to compare the first slice and the second slice is based, at least in part, on how many zeros are in the third and fourth bloom filters.

21. The non-transitory computer-readable medium of claim 12 wherein the method further comprises, in response to determining that the first portion of the first replica has deviated from the second portion of the second replica by more than a particular threshold, performing a corrective measure to reduce deviation between the first portion and the second portion.

22. The non-transitory computer-readable medium of claim 21 wherein the corrective measure includes comparing access keys of chunks that belong to the first portion with access keys of chunks that belong to the second portion.

23. A system comprising:
    one or more storage devices storing a first replica of a chunk set and a second replica of the chunk set;
    one or more computing devices configured to detect when deviation between the first replica and the second replica exceeds a particular threshold by performing the steps of:
        generating a first bloom filter based on access keys that fall into a first slice;
        wherein the first slice corresponds to a first portion of the first replica of the chunk set;
        generating a second bloom filter based on access keys that fall into a second slice;
        wherein the second slice corresponds to a second portion of the second replica of the chunk set;
        performing a comparison between the first bloom filter and the second bloom filter; and
        based on the comparison, determining whether the first portion of the first replica has deviated from the second portion of the second replica by more than the particular threshold.

* * * * *